United States Patent [19]

Takashi

[11] Patent Number: 5,315,789

[45] Date of Patent: May 31, 1994

[54] NUMERICALLY CONTROLLED MACHINE TOOL AND METHOD OF CONTROLLING GRINDING OPERATION THEREOF

[75] Inventor: Kunugi Takashi, Numazu, Japan

[73] Assignee: Kabushiki Kaisha Toshiba, Japan

[21] Appl. No.: 769,346

[22] Filed: Oct. 2, 1991

Related U.S. Application Data

[63] Continuation of Ser. No. 235,223, Aug. 23, 1988, abandoned.

[30] Foreign Application Priority Data

| Aug. 24, 1987 | [JP] | Japan | 62-210652 |
| Aug. 24, 1987 | [JP] | Japan | 62-210653 |
| Sep. 22, 1987 | [JP] | Japan | 62-239778 |
| Sep. 22, 1987 | [JP] | Japan | 62-239779 |
| Sep. 22, 1987 | [JP] | Japan | 62-239780 |
| Sep. 22, 1987 | [JP] | Japan | 62-239781 |
| Sep. 22, 1987 | [JP] | Japan | 62-239782 |
| Sep. 24, 1987 | [JP] | Japan | 62-241996 |

[51] Int. Cl.$^5$ .................................... B24B 49/00
[52] U.S. Cl. .................... 51/165.71; 51/165.77; 51/34 C; 364/474.06; 82/11; 82/118
[58] Field of Search ......... 51/165.71, 165 TP, 165.77, 51/34 C, 34 E, 35, 49, 289 R; 82/11, 118; 364/474.06

[56] References Cited

U.S. PATENT DOCUMENTS

| 3,685,375 | 8/1972 | Hill et al. ............................. 82/11 |
| 3,766,369 | 10/1973 | Watanabe et al. ......... 364/474.06 X |
| 4,214,309 | 7/1980 | Koide et al. ............... 364/474.06 X |
| 4,238,205 | 12/1980 | Geiger et al. ....................... 51/49 X |
| 4,484,413 | 11/1984 | Yamamoto et al. ....... 364/474.06 X |
| 4,564,914 | 1/1986 | Ballough et al. ................. 82/118 X |
| 4,648,025 | 3/1987 | Yoneda et al. ................ 51/165.71 X |

Primary Examiner—M. Rachuba
Attorney, Agent, or Firm—Banner, Birch, McKie & Beckett

[57] ABSTRACT

A numerically controlled machine tool such as a roll grinder grinds a workpiece into a roll shape by rotating the workpiece about its own axis at a prescribed speed, and moving a grinding tool in radial and axial directions of the workpiece. The machine tool has a first motor for rotating the grinding tool about its own axis and a second motor for moving toward and away from the workpiece in the radial direction thereof. The machine tool also includes a detector for detecting a drive current supplied to the first motor, and a control unit for comparing the value of the drive current detected by the detector and a preset current value and for controlling the second motor based on the result of comparison.

11 Claims, 15 Drawing Sheets

FIG.4

| VARIABLE NO. | CONTENTS | |
|---|---|---|
| V8502 | COORDINATES OF LEFTHAND ROLL END (P1) | |
| V8503 | COORDINATES OF ROLL CENTER (P2) | |
| V8504 | COORDINATES OF RIGHTHAND ROLL END (P3) | |
| V8510 | ROLL SHAPE<br>1 = SINE<br>2 = SINE, TAPER, ARC<br>3 = ARC, TAPER, SINE<br>4 = RIGHTHAND TAPER<br>5 = LEFTHAND TAPER | NO.1 |
| V8511 | ROLL LENGTH (RL) | |
| V8512 | LENGTH OF CAMBERING (L) | |
| V8513 | DEPTH OF CAMBERING (D) | |
| V8520 ∫ V8529 | | NO.2 |
| V8600 ∫ V8609 | | NO.10 |

NUMERICALLY CONTROLLED MACHINE TOOL AND METHOD OF CONTROLLING GRINDING OPERATION THEREOF

This application is a continuation of application Ser. No. 235,223, filed Aug. 23, 1988 now abandoned.

BACKGROUND OF THE INVENTION

The present invention relates to a numerically controlled machine tool such as a roll grinder for grinding a workpiece into a roll shape and a method of controlling grinding operation of the numerically controlled machine tool, and more particularly to a numerically controlled machine tool capable of machining a workpiece to a desired shape while correcting wear, damage, and the like of a workpiece and taking into account elastic deformation of the workpiece, wear of a tool, and the like.

Numerically controlled machine tools, typically roll grinders for grinding workpieces into roll shapes, are generally arranged to grind the workpiece into a roll shape while rotating the workpiece at a prescribed speed, moving a tool radially toward and away from the workpiece and axially of the workpiece. Since the tool has to be moved, the machine tool has a memory for storing numerical control data by which amounts of radial movement of the tool are successively programmed dependent on axial positions of the tool, and a control unit for supplying command pulses to drive units to move the tool based on the numerical control data. The numerically controlled machine tools are widely used for machining rolls or the like.

Rolls to be machined by numerically controlled machine tools include differently shaped rolls ranging from simple cylindrical rolls to rolls having taper, sine, and arcuate outer peripheral shapes to meet various applications. Heretofore, rolls having such outer peripheral shapes have generally been ground by employing cams. Use of cams is however disadvantageous in that a suitable cam has to be selected when a roll to be ground has a different outer peripheral shape, a different length, a different radius, or other different parameters, and that the efficiency of the grinding process is low.

It is possible to machine a workpiece relatively simply into a desired roll which has an outer peripheral shape that can be represented by a relatively simple formula, such as a sine curve. In this machining process, a workpiece portion to be machined, is divided into small segments, each of which is approximated by a straight line or an arc to produce numerical control data (machining program), and the produced numerical data are used to control the machine tool. However, since machining programs thus produced are very long and complex, they are not suitable for manufacturing rolls having complicated outer peripheral shapes.

For grinding a workpiece highly precisely into a roll, the depth of cut by which the workpiece is radially ground by a tool (i.e., a rotatable grinding wheel) is of great importance during the grinding process. If there were no other factors or elements to be taken into consideration, then a target (command) depth of cut would be the same as a net depth of cut, making it possible to grind the workpiece accurately.

On a roll grinder, however, the rotatable grinding wheel is worn as the grinding process goes on, and hence the actual depth of cut is smaller than a given target depth of cut. In addition, since the grinding wheel is pressed against the workpiece under certain pressure during the grinding process, the workpiece or roll is slightly elastically deformed. The amount by which the roll is elastically deformed is also responsible for reducing the actual depth of cut smaller than the given target depth of cut.

High-precision grinding of a workpiece into a roll therefore requires a machining program to be prepared while taken into account wear on the grinding wheel, and elastic deformation of the roll. Inasmuch as the amounts of correction to be effected by the machining program for wear and elastic deformation vary from grinding wheel to grinding wheel and from roll to roll, predictive values for the amounts of correction have to be determined with respect to each grinding wheel and each roll. The amount of wear of the grinding wheel varies with time in the grinding process, and it is highly difficult to prepare the numerical control program taking such a time-dependent variation in the amount of wear into consideration. One practice for grinding a workpiece using a machining program prepared on predictive values has been to measure the dimensions of a roll to confirm the dimensional accuracy thereof when the grinding wheel approaches a target cutting position, correct the depth of cut, and start the grinding process again. This grinding operation is however very poor in efficiency.

Rolls which have been in use for certain periods of time are worn differently dependent on what they have been used for and how they have been used. Even a single roll has a portion which is worn to a larger extent and a portion which is worn to a smaller extent. For efficiently grinding such a roll, therefore, the portion which is less worn has to be intensively ground to a desired roll shape, a process known as a truing process.

In the truing process, an individual roll shape is measured to check how it is worn, and based on the measurement, a machining program is prepared for grinding the roll. Alternatively, a machining program for grinding the roll to a uniform diameter irrespective of how it is worn is used to grind the roll. According to the former procedure, machining programs have to be prepared respectively for rolls to be ground, dependent on the worn conditions of the rolls. The latter uniform grinding method does not require machining programs to be prepared for the respective rolls, but results in a long machining time since the rolls must be ground uniformy regardless of their worn conditions.

SUMMARY OF THE INVENTION

It is a major object of the present invention to provide a numerically controlled machine tool such for example as a roll grinder which is capable of grinding a workpiece to a desired shape efficiently and highly accurately while taking into account wear of a tool such as a rotatable grinding wheel, and elastic deformation and localized wear of the workpiece, and a method of controlling the numerically controlled machine tool.

Another object of the present invention is to provide a numerically controlled machine tool for grinding a workpiece into a roll shape by rotating the workpiece about its own axis at a prescribed speed, and moving a grinding tool in radial and axial directions of the workpiece, the numerically controlled machine tool comprising: first drive means for rotating the grinding tool; detector means for detecting a drive current supplied to the first drive means; second drive means for moving the grinding tool in the radial direction of the workpiece; and control means for comparing the value of the drive current detected by the detector means and a preset current value and for controlling the second drive means based on the result of comparison.

Still another object of the present invention is to provide a numerically controlled machine tool for grinding a workpiece into a roll shape by rotating the workpiece about its own axis at a prescribed speed, and moving a grinding tool in radial and axial directions of the workpiece, the numerically controlled machine tool comprising: first drive means for moving the grinding tool in the radial direction of the workpiece; second drive means for moving the grinding tool in the axial direction of the workpiece; setting means for setting a ground shape of the workpiece as a formula; and control means for preparing point group data for controlling the first and second drive means based on the formula set by the setting means.

Yet another object of the present invention is to provide a numerically controlled machine tool for grinding a workpiece into a roll shape by rotating the workpiece about its own axis at a prescribed speed, and moving a grinding tool in radial and axial directions of the workpiece, the numerically controlled machine tool comprising: detector means for detecting a drive current supplied to a drive motor for rotating the grinding tool; wear correcting means for calculating the amount of wear on the grinding tool as a corrective amount of movement of the grinding tool in the radial direction of the workpiece based on the value of the detected drive current; and means for adding the corrective amount of movement of the grinding tool to a target amount of movement thereof to compensate for a reduction in the amount of grinding due to wear on the grinding tool.

Still another object of the present invention is to provide a numerically controlled machine tool for grinding a workpiece into a roll shape by rotating the workpiece about its own axis at a prescribed speed, and moving a grinding tool in radial and axial directions of the workpiece, the numerically controlled machine tool comprising: detector means for detecting a drive current supplied to a drive motor for rotating the grinding tool; elastic deformation correcting means for calculating the amount of elastic deformation of the grinding tool which is produced by grinding the workpiece with the grinding tool in the radial direction of the workpiece, as a corrective amount of movement of the grinding tool based on the value of the detected drive current; and means for adding the corrective amount of movement of the grinding tool to a target amount of movement thereof to compensate for a reduction in the amount of grinding due to elastic deformation of the grinding tool.

Yet still another object of the present invention is to provide a method of controlling grinding operation of a numerically controlled machine tool for grinding a workpiece into a roll shape by rotating the workpiece about its own axis at a prescribed speed, and moving a grinding tool in radial and axial directions of the workpiece, the method comprising the steps of: selecting a workpiece and a ground shape to which the workpiece is to be ground; selecting parameters for the selected ground shape; calculating point group data for grinding the workpiece according to a prescribed formula based on the parameters and the ground shape; storing the point group data in a memory at a storage area corresponding to the workpiece; and reading the stored point group data out of the memory and controlling the grinding tool based on the point group data to grind the workpiece to the selected ground shape.

A further object of the present invention is to provide a method of controlling grinding operation of a numerically controlled machine tool for grinding a workpiece into a roll shape by rotating the workpiece about its own axis at a prescribed speed, and moving a grinding tool in radial and axial directions of the workpiece, the method comprising the steps of: detecting a drive current supplied to a drive motor for rotating the grinding tool; causing the grinding tool to cut into the workpiece in the radial direction thereof until the value of the detected drive current reaches a preset current value; thereafter, moving the grinding wheel in the axial direction of the workpiece to grind the workpiece; when the value of the detected drive current drops below the preset current value, causing the grinding tool to cut into the workpiece in the radial direction thereof until the value of the detected drive current reaches the preset current value; and reversing the movement of the grinding tool in the axial direction of the workpiece to continuously grind the workpiece.

A still further object of the present invention is to provide a method of controlling grinding operation of a numerically controlled machine tool for grinding a workpiece into a roll shape by rotating the workpiece about its own axis at a prescribed speed, and moving a grinding tool in radial and axial directions of the workpiece, the method comprising the steps of: detecting a drive current supplied to a drive motor for rotating the grinding tool; and after the value of the detected drive current has met a preset comparative condition, switching from a machining program being executed to another machining program.

A Yet further object of the present invention is to provide a method of controlling grinding operation of a numerical)y controlled machine tool, wherein when the value of the detected current reaches a preset current value which is the preset comparative condition, the switching from the machining program being executed to the other machining program is effected.

A yet still further object of the present invention is to provide a method of controlling grinding operation of a numerically controlled machine tool, wherein the difference between the value of the detected drive current and a preset current value which is the preset comparative condition is determined, and the grinding tool is moved toward the workpiece at a prescribed speed dependent on the difference for grinding the workpiece.

Another object of the present invention is to provide a method of controlling grinding operation of a numerically controlled machine tool for grinding a workpiece into a roll shape by rotating the workpiece about its own axis at a prescribed speed, and moving a grinding tool in radial and axial directions of the workpiece, the method comprising the steps of: providing a plurality of commands for commanding prescribed movements for first drive means for rotating the grinding tool, second drive means for moving the grinding tool in the radial direction of the workpiece, and third drive means for moving the grinding tool in the axial direction of the workpiece to perform different machining functions and a particular command for enabling at least one of the plurality of commands; and selecting and enabling at least one of the plurality of commands based on parameters given with the particular command to grind the workpiece.

Still another object of the present invention is to provide a method of controlling grinding operation of a numerically controlled machine tool for grinding a workpiece into a roll shape by rotating the workpiece about its own axis at a prescribed speed, and moving a grinding tool in radial and axial directions of the workpiece, the method comprising the steps of: detecting a drive current supplied to a drive motor for rotating the grinding tool; calculating a corrective amount of movement of the grinding tool, corresponding to the amount of wear of the grinding tool, in the radial direction of the workpiece, based on the value of the detected drive current; then correcting a wear correcting coefficient at a prescribed time interval based on the difference between the value of a target current to be supplied to the drive motor and the value of the detected drive current and the prescribed time interval; and correcting the corrective amount of movement of the grinding tool successively with the wear correcting coefficient and adding the corrected amount to a target amount of movement to compensate for a reduction in the amount of grinding of the workpiece due to wear on the grinding tool.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing storage areas for storing roll shapes, parameters, and other data;

DETAILED DESCRIPTION OF THE PREFERRED EMBODIMENT

Figure 1:
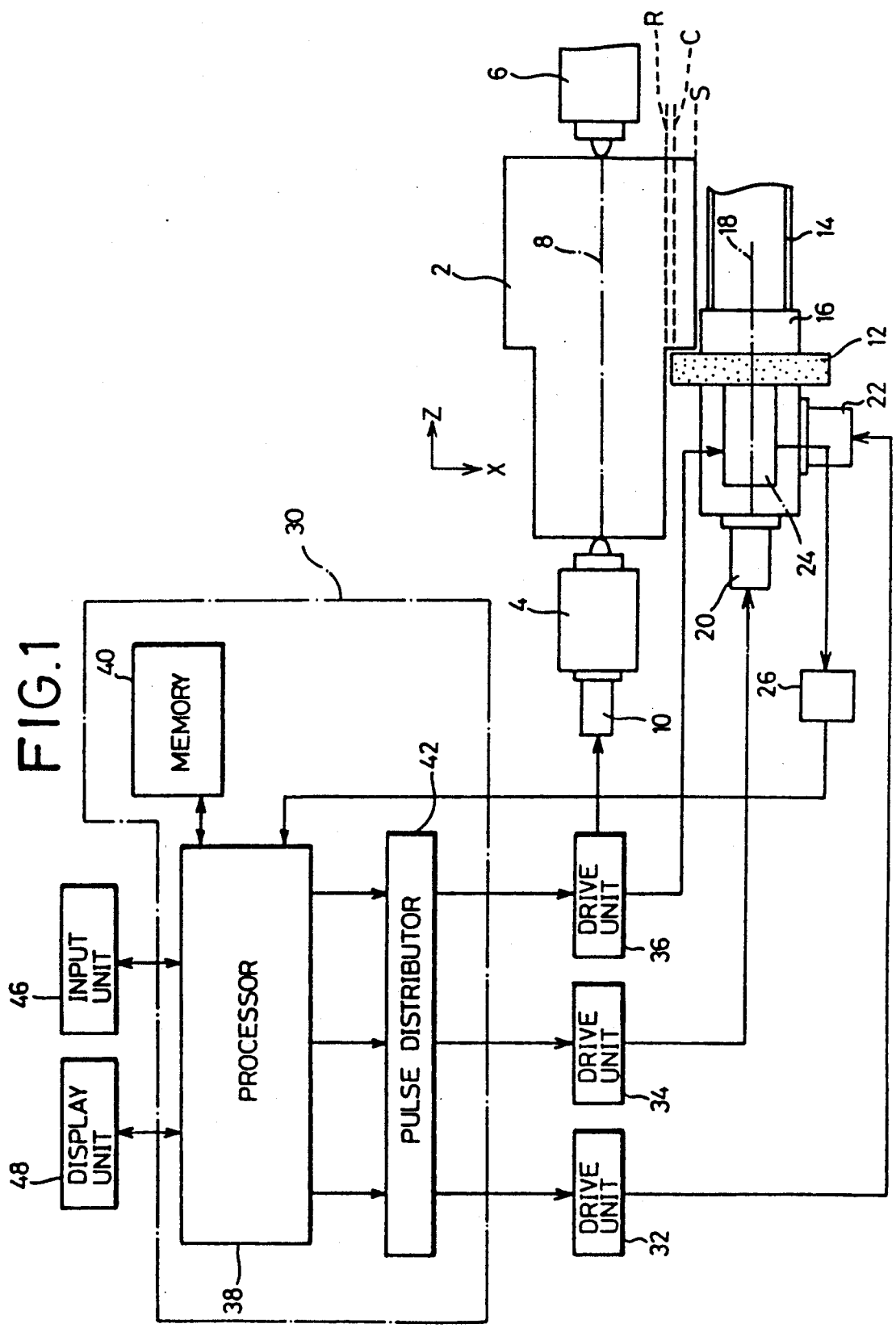
FIG. 1 is a schematic view, partly in block form, of a numerically controlled machine tool according to the present invention.

FIG. 1 schematically shows a numerically controlled machine tool according to a preferred embodiment of the present invention. A roll or workpiece 2 to be machined or ground by the numerically controlled machine tool is gripped between a headstock support 4 and a tailstock support 6 in alignment with an axis 8 extending in a Z direction. The headstock support 4 includes a spindle which can be rotated by a spindle motor 10 for rotating the roll 2 about the axis 8 at a prescribed speed.

A grinding tool or rotatable grinding wheel 12 is mounted on a slide table 16 guided by a guide 14 for rotation about an axis 18. The slide table 16 can slide in the Z direction along the guide 14 when driven by a servomotor 20. Moreover, the slide table 16 can slide in an X direction (radially of the roll 2) along another guide mechanism (not shown) when driven by a servomotor 22. The grinding wheel 12 can be rotated about its own axis at a prescribed speed by a grinding wheel motor 24. A drive current (load current) supplied to the motor 24 is detected by a detector 26 which is used for grinding control for correcting the depth of cut or the like, as described later on. A numerical control unit 30 distributes command pulses to drive units 32, 34, 36 which rotate the servomotors 20, 22, the spindle motor 10, and the grinding wheel motor 24 to control the rotation of the roll 2 and the rotation of the grinding wheel 12 and its movement in the Z and X directions for grinding the roll 2 to a shape represented by numerical control data.

The numerical control unit 30 comprises a processor 38 composed of a microcomputer or the like, a memory 40 for storing a control program to enable the processor 38 to effect numerical control operation and also for storing numerical control data, and a pulse distributor 42 for distributing command pulses to the drive units 32, 34, 36 according to commands from the processor 38. The control program and numerical control data can be entered into the numerical control unit 30 through an input unit 46. Denoted at 48 is a display unit such as a CRT or the like. Also designated at R is a target depth of cut, C a net depth of cut, and S a radius of the roll 2 before it is ground.

Figure 2:
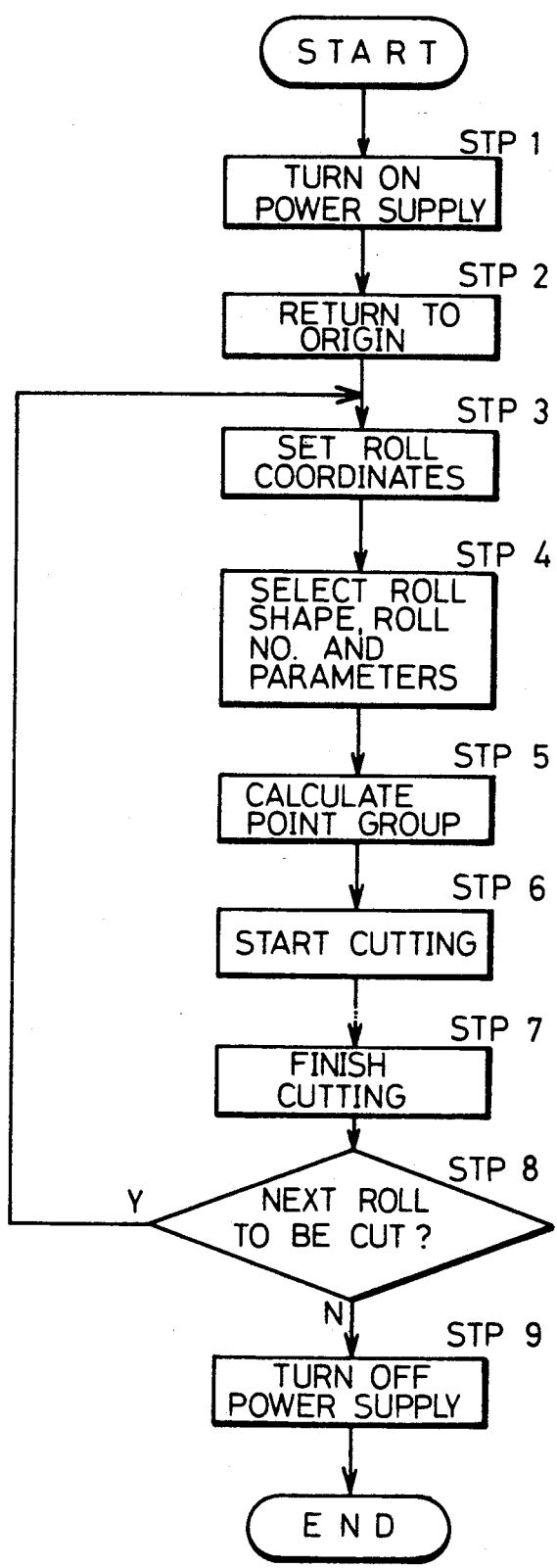
FIG. 2 is a flowchart of a process of producing a roll of a desired shape by employing the numerically controlled machine tool of the present invention.

The numerically controlled machine tool of the present invention, basically constructed as described above, will operate as follows:

By inputting shape parameters into the numerically controlled machine tool, it can produce rolls 2 of various outer peripheral shapes to meet desired applications. A grinding process will be described with reference to the flowchart of FIG. 2.

The power supply for the numerically controlled machine tool is turned on in a step 1, and then the slide table 16 on which the grinding wheel 12 is rotatably mounted is returned to an origin by moving the same in the radial direction (X axis) of the roll 2 and in the axial direction (Z axis) of the roll 2 in a step 2. This operation is carried out by using the input unit 46 while monitoring the returning process on the display unit 48 connected to the numerical control unit 30.

Then, coordinates of the roll 2 are set in a step 3 for determining the range of movement of the slide table 16. The step 3 is followed by a step 4 in which the shape of the roll 2, the number of the roll 2, and parameters thereof are selected and entered. Preferably, at this time, the numerical control unit 30 is in an edit mode, and the required data can easily be input according to menus which are successively displayed on the display unit 48.

The memory 40 has storage areas for storing shapes and parameters of a plurality of desired rolls 2 (ten in number in the embodiment shown in FIG. 4. First, a roll number is selected, and then a roll shape is selected. Five suitable roll shapes are a sine shape, a combination of sine, taper, and arc shapes, a combination of arc, taper, and sine shapes, a righthand taper shape, and a lefthand taper shape. A roll shape can be designated by a corresponding code number. It is also possible for the user to establish other roll shapes and designate a selected one of these other roll shapes.

Figure 3A:
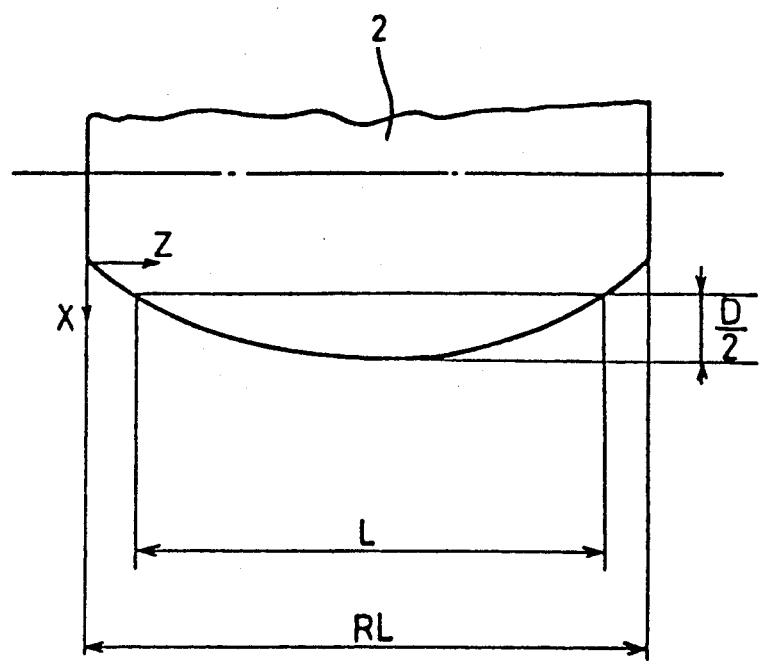
FIGS. 3a through 3e are fragmentary views explaining shapes and parameters of rolls.
Figure 3B:
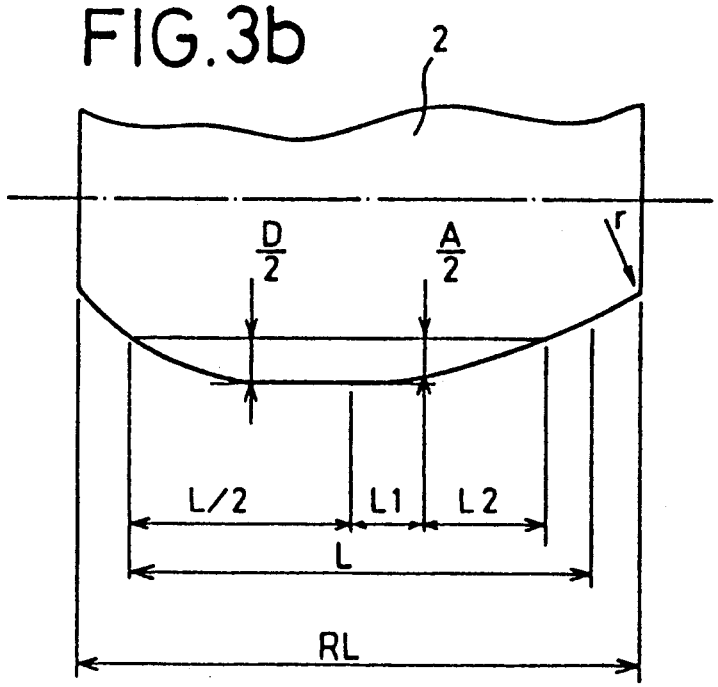
Figure 3C:
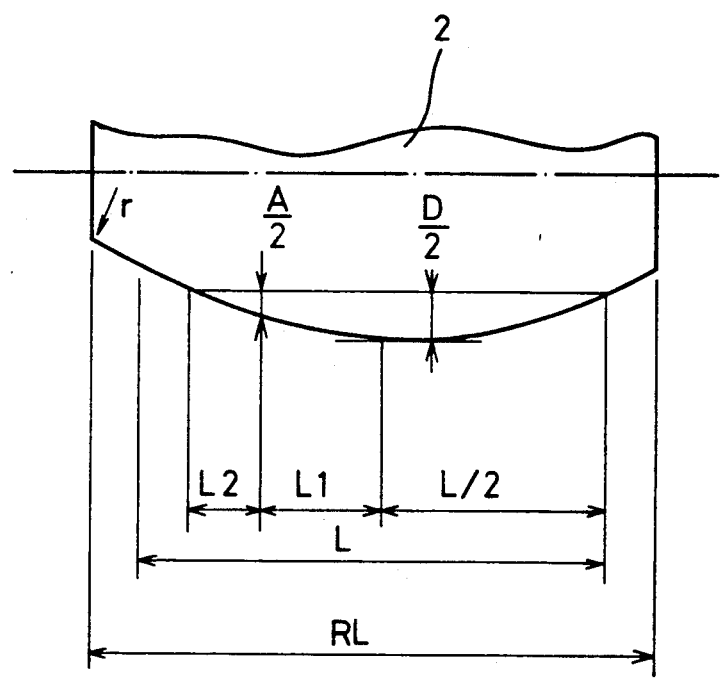
Figure 3D:
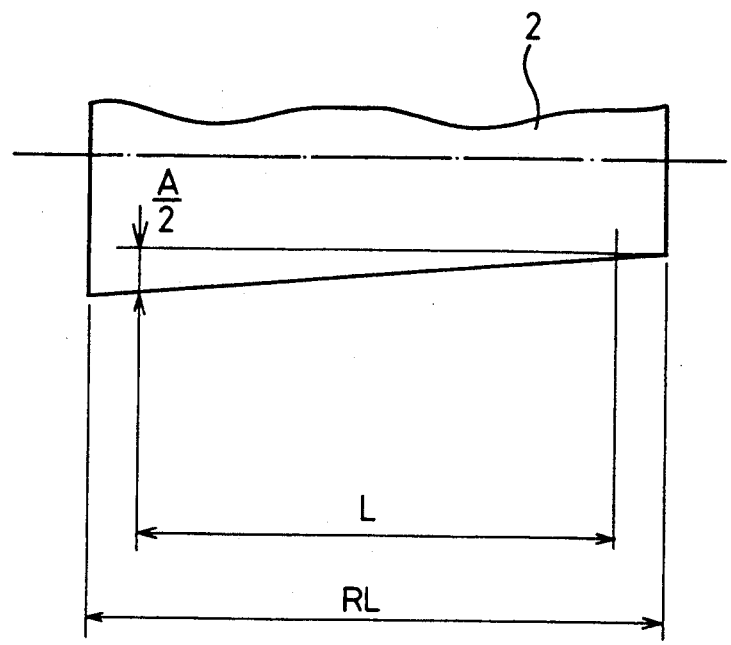
Figure 3E:
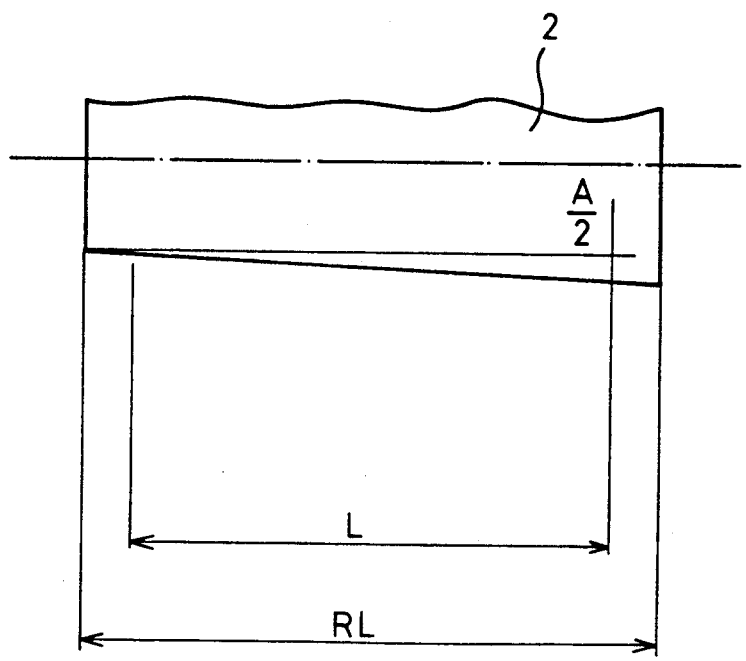

After a roll shape has been designated, parameters which are predetermined for that roll shape are entered. FIGS. 3a through 3e show roll shapes and parameters of different rolls 2. FIG. 3a illustrates a roll 2 with its outer periphery to be ground to a sine shape. The parameter L indicates a designated length of cambering, the parameter D indicates the depth of cambering, and the parameter RL indicates a roll length. FIG. 3b shows a roll 2 with its outer periphery to be ground to a combination of sine, taper, and arc curves. The parameters L, D, RL are the same as those shown in FIG. 3a. The parameter L1 indicates the length of a sine curve, the parameter L2 indicates the length of a taper curve, the parameter A indicates the amount of a taper, and the parameter r indicates the radius of an arc. FIG. 3c illustrates a roll 2 with its outer periphery to be ground to a combination of arc, taper, and sine curves. The illustrated parameters are the same as those of FIG. 3b. FIG. 3d shows a roll 2 to be ground to a righthand taper shape. The parameter RL represents a roll length, the parameter L represents a designated length of cambering, and the parameter A indicates the amount of a taper. FIG. 3e shows a roll 2 with its outer periphery to be ground to a lefthand taper shape. The parameters are the same as those shown in FIG. 3d.

These parameters as well as roll numbers and roll shapes can be entered through a keyboard of the input unit 46. The entered roll numbers, roll shapes, and parameters are stored in the memory 40 in mutually corresponding relationship.

FIG. 4 shows storage areas of the memory 40 for storing the roll shapes and parameters. P1 represent coordinates of the lefthand end of the roll, P2 coordinates of the center of the roll, and P3 coordinates of the righthand end of the roll. The storage area No. 1 stores the roll shape and parameters for the roll number 1. The stored roll shape is one of code numbers indicating the roll shapes shown in FIGS. 3a through 3e, and the stored parameters correspond to the stored roll shape. The storage areas Nos. 2 through 10 store roll shapes and parameters for the roll numbers 2 through 10.

After the roll number, the roll shape, and the parameters have been entered in the step 4, point group data constituting numerical control data (machining program) are, calculated according to a predetermined formula corresponding to the designated roll shape in a step 5. If the roll shape is a sine shape shown in FIG. 3a, for example, then the depth of cut X to which the roll 2 is to be ground by the grinding wheel 12 in the radial direction is given by:

$$X = \frac{D/2}{1 - \cos\theta} \left[ \cos \frac{2Z - L}{L} \theta - \cos\theta \right]$$

where $0 < Z = < L$, Z indicates the axial position of the roll 2, and $\theta$ is a parameter inherent with the machine tool and determined by the curvature of the sine curve, for example. The point group data calculated according to the above formula are then stored in the memory 40 in corresponding relation to the roller number and the roll shape.

After the point group data constituting the numerical control data have been calculated and stored in the memory 40 at a prescribed area, the stored point group data are successively read out in a step 6, and the movement of the grinding wheel 12 in the axial direction (Z axis) and the radial direction (X axis) is controlled based on the point group data for grinding the roll 2 to a designated cambering curve. After the roll 2 has been ground over its entire length in a step 7, a next step 8 checks if there is a command for grinding a next roll. If there is, then the above steps 3 through 7 are repeatedly executed. If there is no such command, then the power supply for the numerically controlled machine tool is turned off, and the grinding process is finished.

For grinding a roll 2 efficiently and highly accurately using a numerically controlled machine tool such as a roll grinder or the like, it is necessary to grind the roll 2 while taking into account wear on the grinding wheel 12, localized wear on the roll 2 during prolonged use, or elastic deformation of the roll 2.

Various machining functions which the numerically controlled machine tool has will be described below.

Figure 5:
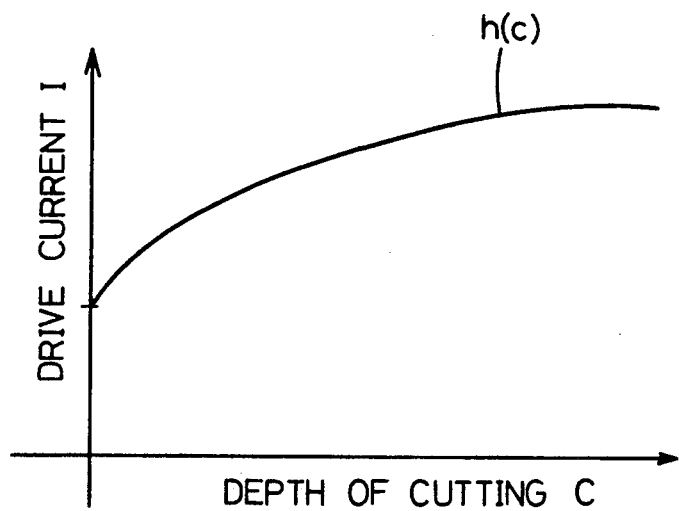
FIG. 5 is a graph showing the relationship between the drive current supplied to a grinding wheel rotating motor and the depth of cut by a grinding wheel.

FIG. 5 shows the relationship between the value of a drive current I supplied to the grinding wheel motor 24 for rotating the grinding wheel 2 and the amount of movement of the grinding wheel 12 in the radial direction of the roll 2, i.e., the depth of cut C. The drive current I and the depth of cut C are related to each other according to a function $I = h(C)$, as explained below.

While the grinding wheel motor 24 is rotating at constant speed, the torque $\tau$ produced by the grinding wheel motor 24 is proportional to the frictional force $\theta$ produced between the grinding wheel 12 and the roll 2. In a range in which the depth of cut C is not excessively large, the frictional force $\theta$ is proportional to the depth of cut C, or monotonously increasing. Hence, $$\tau \propto \theta \propto C, \text{ or } \tau \propto \theta = h(C) \quad (1)$$

where h(C) is a monotonously increasing function. Where the grinding wheel motor 24 is a DC motor, then the generated torque $\tau$ is in proportion to the drive current I. Therefore, $$I \propto \tau \quad (2)$$

As a result, from the relationship indicated by the formulas (1) and (2), there is a simple proportional relationship or monotonously increasing relationship indicated by:

$$I = h(C) \quad (3)$$

between the depth of cut C and the drive current I. Consequently, the depth of cut C by the grinding wheel 12 can be determined from the value of the drive current I. Even if the grinding wheel motor 24 is an AC motor such as an induction motor, it is possible to determine the generated torque τ from the drive current I, and thus, basically, the depth of cut C can be determined from the drive current I in the same manner as when a DC motor is employed as the grinding wheel motor 24.

The drive current I supplied to the grinding wheel motor 24 is detected by the detector 24, and the movement of the grinding wheel 12 in the radial direction (X axis) of the roll 2 is controlled by the processor 38 so that the roll 2 can be ground to a depth of cut according to a preset current, for grinding the roll 2 while moving the grinding wheel 12 in the axial direction of the roll 2. When the drive current I drops below the preset current, the grinding wheel 12 is moved in the radial direction (X axis) of the roll 2 to cut into the roll 2 until the preset current is reached. After the preset current is reached, the movement of the grinding wheel 12 in the axial direction is reversed, and the roll 2 is ground up to its collar at an end thereof. By thus grinding the roll 2, the roll 2 which has been subjected to localized wear during usage over a certain period of time can be ground automatically at a portion thereof which is less worn, without having to programming numerical control data according to surface irregularities or worn conditions of individual rolls 2 Therefore, the roll 2 can efficiently be ground uniformly down to the most worn region thereof.

Figure 6:
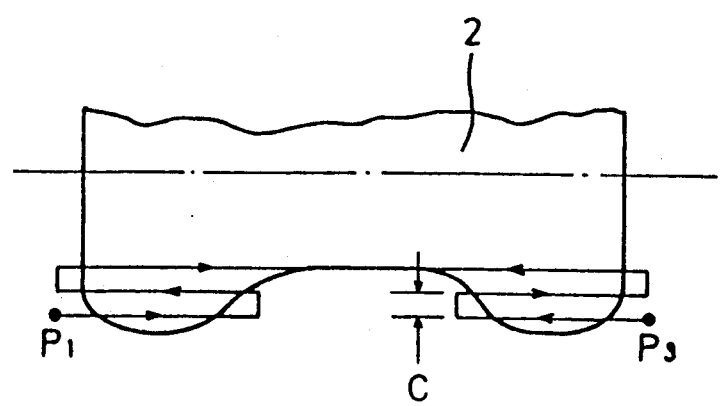
FIGS. 6 and 7 are fragmentary views illustrating paths along which rolls are ground by grinding wheels.
Figure 7:
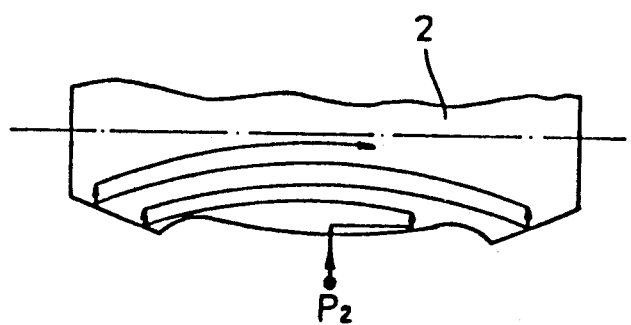

FIGS. 6 and 7 show paths of movement of the grinding wheel 12 for grinding rolls 2 in the above truing process. In each of FIGS. 6 and 7, the roll 2 to be ground is fixedly supported between the headstock support 4 and the tailstock support 6 and rotated at a given speed by the spindle motor 10, as shown in FIG. 1.

FIG. 6 shows a roll 2 which is more worn at a central region thereof and less worn at opposite ends thereof. The grinding wheel 12 starts grinding the roll 2 from points P1, P2 at the opposite ends or collars of the roll 2. The depth of cut C by the grinding wheel 12 in the radial direction of the roll 2 is set in the memory 40 of the numerical control unit 30 as a preset current value which is a threshold value to be compared with the drive current I supplied to the grinding wheel motor 24, i.e., the current detected by the detector 26. FIG. 7 shows a truing process for grinding a convex crown roll of an arcuate outer peripheral shape which has been subjected to localized wear into a concave crown roll. The grinding wheel 12 starts grinding the roll from a central point P2 where the amount of wear is small.

In the truing process, the grinding wheel 12 moves from the starting point P1 or P3 (FIG. 6) or the starting point P2 (FIG. 7) in the axial direction of the roll 2, while cutting into the roll 2 in the radial direction. Prior to the grinding operation, the grinding wheel 12 is moved in the radial direction (X axis) of the roll 2, and when the grinding wheel 12 contacts the roll 2, the current supplied to the grinding wheel motor 24 varies. By detecting the current supplied to the grinding wheel motor 24 and comparing the detected current with a preset threshold value, therefore, it can be determined whether the grinding wheel 12 has contacted the roll 2 or not. Upon contact of the grinding wheel 12 with the roll 2, the execution of a machining program for moving the grinding wheel 12 toward the roll 2 is interrupted, and a next machining program is executed. The amount of radial movement of the grinding wheel 12, which is designated in a step of the interrupted program is canceled.

Then, based on the next program, the grinding wheel 12 is moved in the axial direction (Z axis) of the roll 2 to grind the roll 2. When the grinding wheel 12 reaches a less worn region of the roll 2, the current supplied to the grinding wheel motor 24 is reduced. Then, the direction of movement of the grinding wheel 12 along the axis of the roll 2 is reversed to continue the grinding operation in the opposite direction. The roll 2 can therefore be trued or ground efficiently without measuring the shape of each roll to be trued and preparing a machining program for such a roll.

Figure 8:
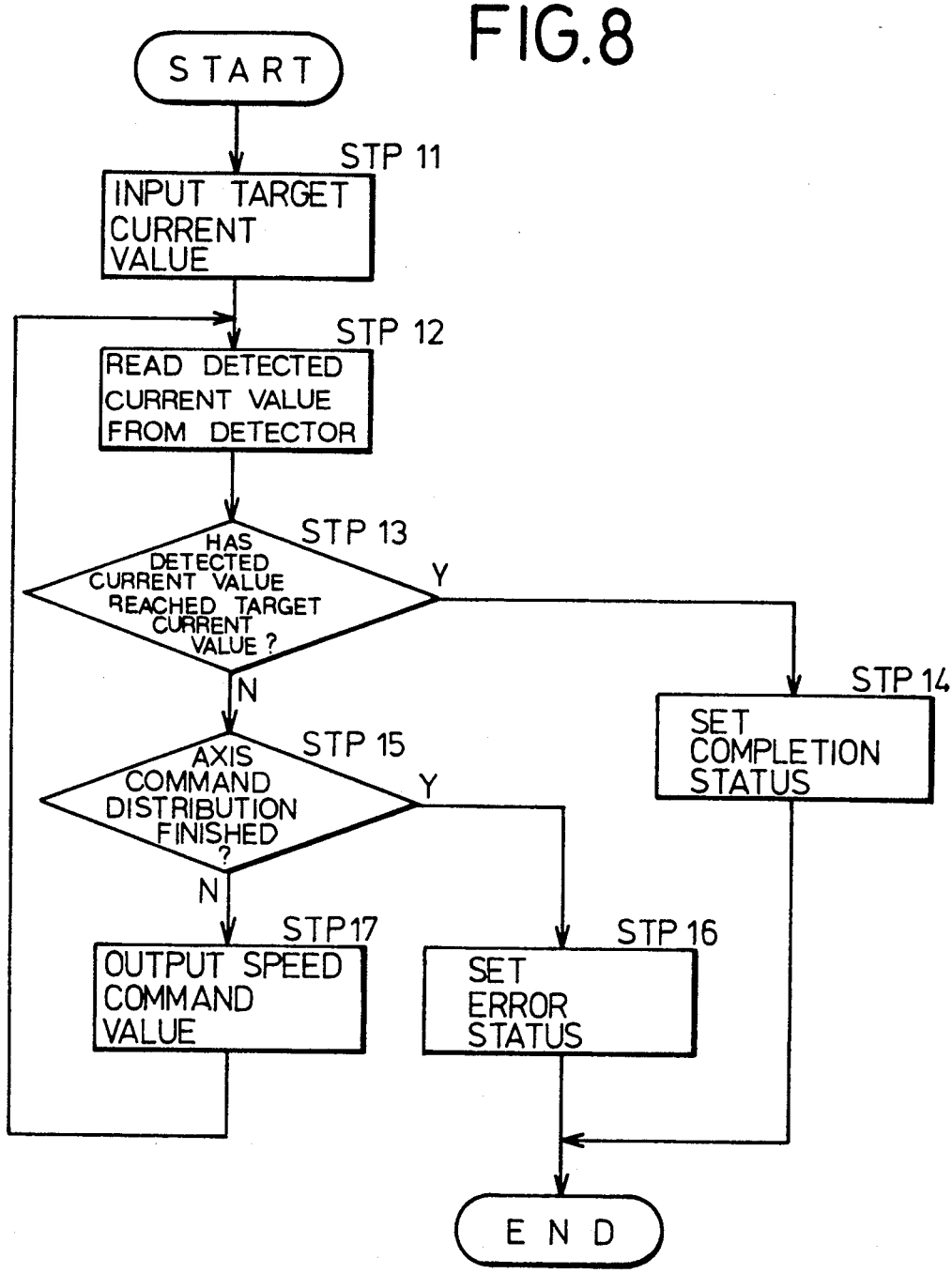
FIG. 8 is a flowchart of a skipping control sequence in a grinding control method according to the present invention.

FIG. 8 shows a skipping control sequence for switching from radial movement of the grinding wheel 12 to axial movement of the grinding wheel 12 during the grinding process.

In a step 11, the value of a target current (preset current) to be applied to the grinding wheel motor 24 is entered as a preset value to execute a truing process or a machining command (machining program) such as a grounding wheel touching command, for example. The detector 26 monitors the drive current supplied to the grinding wheel motor 24 in a step 12, and the drive current value from the detector 26 is compared with the target current value in the processor 38 in a step 13. If the detected current has reached the target current in the step 13, then a machining program being executed is interrupted, and a completion status is set in a step 14, whereupon the remaining amount of movement for the grinding wheel 12 is canceled. Then, a next program is executed to move the grinding wheel 12 in the axial direction of the roll 2, for example.

If the detected current has not yet reached the target current in the step 13, a step 15 checks if axis command distribution has been finished or not. If finished, then an error condition is declared and an error status is set in a step 16. If not finished, then a speed command value is outputted in a step 17, and the machining process from the step 12 is continued.

A corrective function which the numerically controlled machine tool of the invention has for correcting the amount of grinding will be described below.

Figure 9:
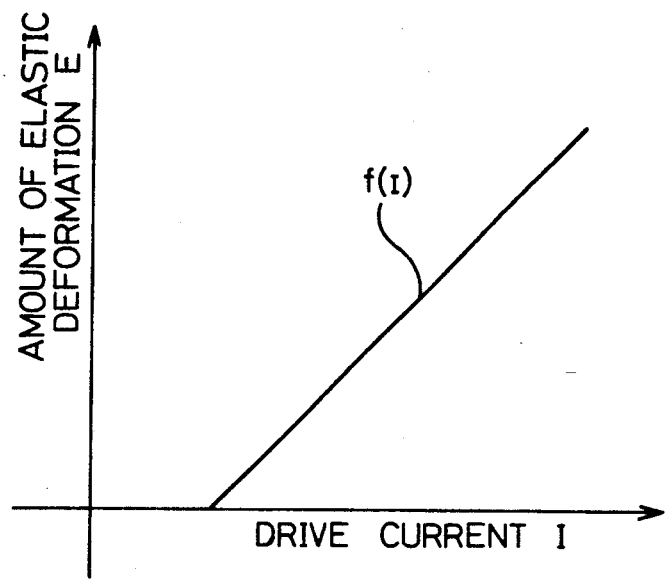
FIG. 9 is a graph showing the relationship between the amount of elastic deformation of a roll and the drive current supplied to rotate a grinding wheel.

FIG. 9 shows the relationship between the amount of elastic deformation E of the roll 2 being ground and the value of the drive current I supplied to the grinding wheel motor 24. The roll 2 being ground is elastically deformed chiefly under the force with which it is pressed by the grinding wheel 12. The higher the drive current I supplied to the grinding wheel motor 24, the greater the torque produced by the motor 24, and the larger the force with which the grinding wheel 12 presses the roll 2. Therefore, since the roll 2 is elastically deformed in proportion to the drive current I supplied to the grinding wheel motor 24, the amount of elastic deformation E of the roll 2 is expressed as a monotonously increasing function by:

$$E = f(I) \qquad (4)$$

Figure 10:
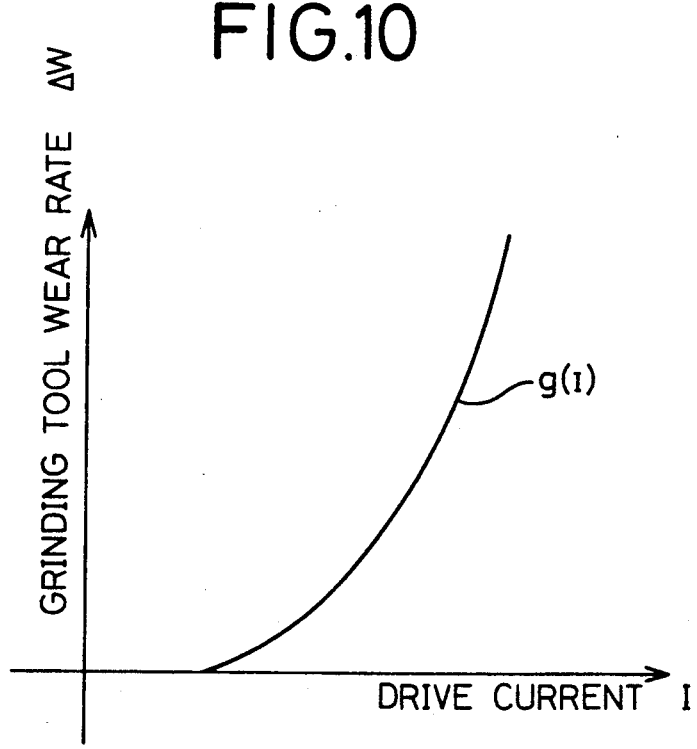
FIG. 10 is a graph showing the relationship between the wear rate of the grinding wheel and the drive current supplied to the grinding wheel rotating motor.

FIG. 10 illustrates the relationship the wear rate ΔW of the grinding wheel 12 and the value of the drive current I supplied to the grinding wheel motor 24. Wear on the grinding wheel 12 is caused by friction between the grinding wheel 12 and the roll 2. As described above, the frictional force θ produced between the grinding wheel 12 and the roll 2 is proportional to the torque $\tau$ generated by the grinding wheel motor 24, and the torque $\tau$ is in turn proportional to the drive current I supplied to the grinding wheel motor 24. Consequently, the amount of wear W of the grinding wheel 12 is also a function of the drive current I of the grinding wheel motor 24. The amount of wear W of the grinding wheel 12 is related to the time in which the grinding wheel 12 and the roll 2 are pressed against each other. The wear rate $\Delta$W of the grinding wheel 12 (i.e., the rate at which the grinding wheel 12 is worn from a time t to a time t+$\Delta$r) is expressed by the following function:

$$\Delta W = g(I) \quad (5)$$

Therefore, the amount of wear W of the grinding wheel 12 is given by integrating the wear rate $\Delta$W with respect to time as follows:

$$W = \int_0^t \Delta W dt = \int_0^t g(I) dt \quad (6)$$

Figure 11:
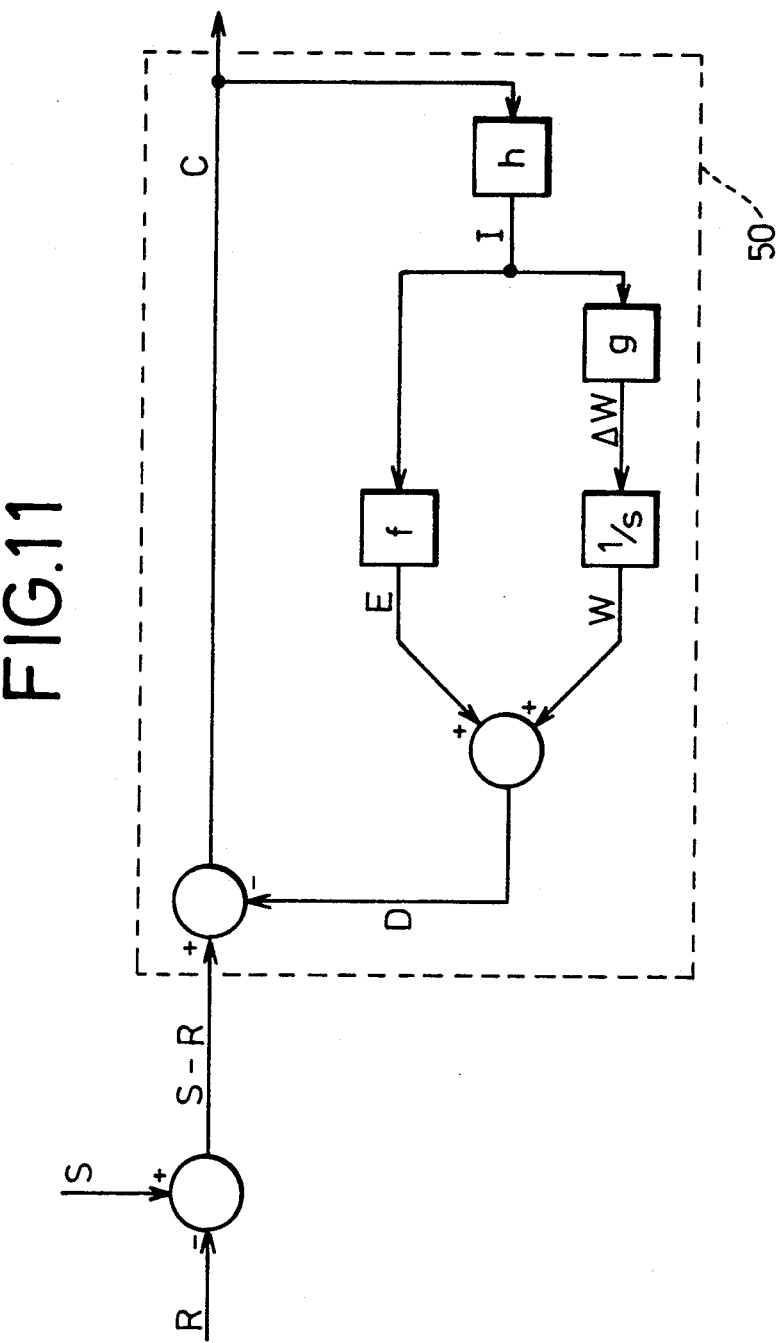
FIG. 11 is a diagram showing a roll grinding process.

FIG. 11 shows a roll grinding process taking the above considerations into account. Assuming that the roll 2 has a radius S prior to being ground and its target depth of cut is expressed by R in FIG. 1, the net depth of cut C would be the same as the target depth of cut R if there were no elastic deformation of the roll 2 and no wear on the grinding wheel 12, and hence $$S - R = S - C \quad$$

Since, however, the net depth of cut C is actually reduced by the amount of elastic deformation E of the roll 2 and the amount of wear W of the grinding wheel 12, we get

S—R=S—C+(E+W), and it is impossible to grind the roll 2 to a desired shape.

The amount of elastic deformation E of the roll 2 is proportional to the drive current I supplied to the grinding wheel motor 24 (see FIG. 9), and the wear rate $\Delta$W of the grinding wheel 12 is a function of the drive current I supplied to the grinding wheel motor 24 (see FIG. 10). The amount of wear W is determined according to the equation (6) as a time integral of the wear rate $\Delta$W. Therefore, assuming that the sum of the amount of elastic deformation D of the roll 2 and the amount of wear W of the grinding wheel 12 is an error D, the roll 2 can be ground to a desired shape by calculating the error D=E+W which is produced in the roll grinding process 50 in FIG. 11 and by which the net depth of cut C is smaller than the target depth of cut R, and correcting the target depth of cut R with the error As described above with reference to FIGS. 5, 9, and 101, the depth of cut C, the amount of elastic deformation E, and the amount of wear W are in certain relationships to the drive current I supplied to the grinding wheel motor 24. In view of this, the value of a load current (the value of drive current) Im supplied to the grinding wheel motor 24 is detected by the detector 26 shown in FIG. 1, the amount of elastic deformation E and the amount of wear W are calculated by the processor 38 in the numerical control unit 30, and the target depth of cut R is corrected by the amount of elastic deformation E and the amount of wear W for automatically correcting the amount of grinding of the roll 2.

Figure 12:
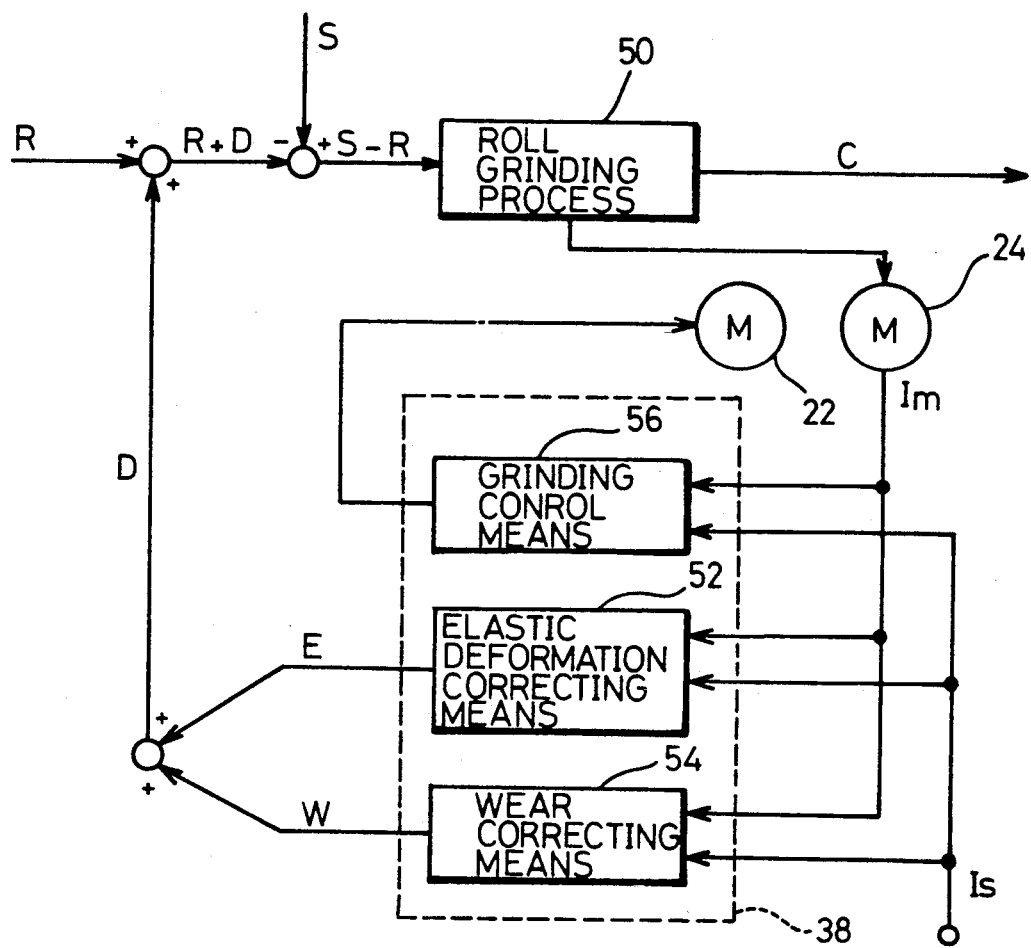
FIG. 12 is a block diagram of a system for correcting the amount by which the roll is to be ground, dependent on elastic deformation of the roll and wear of the grinding wheel.

FIG. 12 is a block diagram of a system for correcting the amount of grinding of the roll 2. In the roll grinding process, the depth of cut C is reduced due to wear on the grinding wheel 12 and elastic deformation of the roll 2. The system includes an elastic deformation correcting means 52, a wear correcting means 54, and a grinding control means 56 of the processor 38 in the numerical control unit 30.

Numerical control data (representing amounts of movement in the axial and radial directions of the roll 2) for the grinding wheel 12 are given as commands, and a target current value Is for the grinding wheel motor 24 is set based on the given commands. The actual current supplied to the grinding wheel motor 24 is detected as a load current Im by the detector 26 in FIG. 1.

The elastic deformation correcting means 52 calculates the amount of elastic deformation E from the target current Is and the actual load current Im as follows:

$$E = f(Im) = k \cdot \Delta I \quad (7)$$

where k is an elastic deformation correcting coefficient of the machine tool, and $\Delta$I is the difference between the target current Is and the load current Im. In view of a dead zone $\delta$ which is a system parameter of the numerically controlled machine tool of the embodiment, $\Delta$I is determined as follows:

$$\Delta I = Is - Im - \delta \quad (8)$$

where Im−Is<$\delta$;

$$\Delta I = 0 \quad (9)$$

where −$\delta \leq$ Im−Is $\leq \delta$;

$$\Delta I = Is - Im + \delta \quad (10)$$

where $\delta$<Im−Is.

The amount of elastic deformation E thus calculated is added to the target depth of cut R. Similarly, the wear correcting means 54 calculates the amount of wear W from the target current Is and the load current Im as follows:

$$\Delta W = g(Im) = q \cdot Is \cdot Im \quad (11)$$

where q is a wear correcting coefficient of the machine tool. The wear rate $\Delta$W is a depth of cut per unit time and corresponds to the speed V at which the grinding wheel 12 cuts into the roll 2 in the radial direction thereof. Since when the roll 2 is ground by the grinding wheel 12 at the speed V, the amount of movement of the grinding wheel 12 in the radial direction is an integral of the speed, the amount of wear W is added to the target depth of cut R. As a result, the depth of cut which is corrected by the amount of elastic deformation E of the roll 2 and the amount of wear W of the grinding wheel 12 is applied as a command to the roll grinding process 50, so that the roll 2 can be ground to a desired shape.

The target current value Is, the elastic deformation correcting coefficient k, and the wear correcting coefficient q can be set together with command codes in the numerical control program, or may be entered by the parameter setting function of the input unit 46 coupled to the numerical control unit 30 and stored into the memory 40.

The wear correcting coefficient q may not necessarily be constant as the amount of wear W of the grinding wheel 12 varies with time in the grinding process. More specifically, the amount of wear w is determined dependent on the speed of rotation of the grinding wheel 12, the depth of cut thereby, the speed at which it is fed in the axial direction, the shape and material of the roll 2, and other factors, and is normally established empirically with respect to the machine tool. However, when the grinding ability of the grinding wheel 12 is lowered due to loading thereof or peeling off of the surface layer of the grinding wheel 12, the aforesaid wear correcting process is not sufficient enough to correct the depth of cut.

To solve this problem, the wear correcting coefficient q is learned and corrected on the basis of a time interval T at which wear correction is effected, and the difference ΔI between the target current Is and the load current Im supplied to the grinding wheel motor 24.

More specifically, a wear coefficient learning command is inserted in the machining program, and the wear correcting coefficient q is calculated and corrected at a prescribed time interval in the wear correcting means 54 shown in FIG. 12 based on the following relationship:

$$q(\text{new}) = q(\text{old}) + a \times \frac{\Delta I}{T} \quad (12)$$

where $a$ is a learning coefficient which is a parameter inherent with the machine tool, and q(new) and q(old) are present and previous wear correcting coefficients. The difference ΔI between the currents is calculated according to the equations (8) through (10) taking the dead zone δ into consideration. When the target current Is and the load current Im are within the dead zone δ, the wear correcting coefficient q(new) remains unchanged. When the target current Is and the load current Im exceed the dead zone δ, the wear correcting coefficient q(new) varies in proportional to the amount by which the target current Is and the load current Im exceed the dead zone 6. At the time the depth of cut C corresponding to the load current Im varies greatly, therefore, the wear correcting coefficient q is automatically corrected because the amount of wear or the grinding ability of the grinding wheel 12 changes. As a consequence, the roll 2 can be ground highly accurately regardless of how the condition of the grinding wheel 12 varies.

The numerically controlled machine tool according to the embodiment has a function of enabling the grinding wheel 12 to cut into the roll 2 to a given depth of cut based on a preset current. More specifically, the load current Im supplied to the grinding wheel motor 24 is detected by the detector 26, the detected load current Im is compared with a preset target current Is by the processor 38, and the grinding wheel 12 is cut radially into the roll 2 at a prescribed speed until the load current Im supplied to the grinding wheel motor 24 reaches the target current Is, for thereby grinding the roll 2 to a predetermined depth of cut. The grinding control means 56 shown in FIG. 12 compares the load current Im detected by the detector 26 with the target current Is, and controls the servomotor 22 to enable the grinding wheel 12 to cut radially into the roll 2 dependent on the difference between the currents at the prescribed speed so that the desired depth of cut C is obtained. The grinding control means 56 operates when a command for grinding the roll 2 based on the target current is included in the machining program. If elastic deformation and wear correcting commands are in the same program block as the command for grinding the roll 2 based on the target current, then these elastic deformation and wear correcting commands are neglected.

Figure 13:
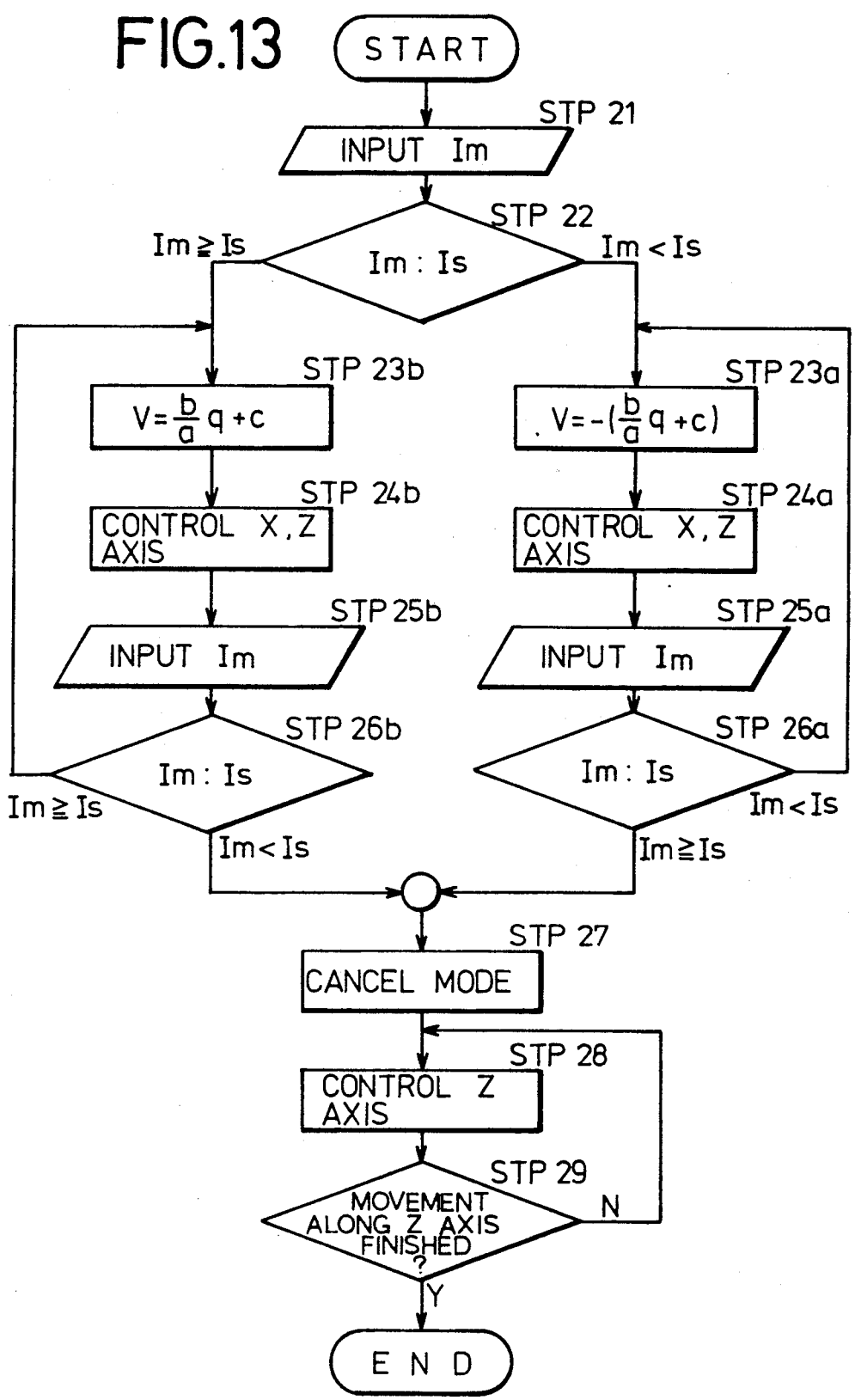
FIG. 13 is a flowchart of a sequence of grinding a roll with a preset current in the grinding control method of the present invention.

The function of enabling the grinding wheel 12 to cut into the roll 2 based on the preset current will be described with reference to the flowchart of FIG. 13. First, numerical control data (the amounts of movement of the grinding wheel 12 in the axial and radial directions of the roll 2, the target current Is for the grinding wheel motor 24, etc.) are given as commands for controlling the grinding wheel 12, and the roll 2 is ground based on these commands in a step 21. The target current Is may be given in the machining program, or entered through the parameter setting function of the input device 46 such as a keyboard or the display unit 48 such as a CRT display, and stored in the memory 40.

When the target current Is is set and a command for grinding the roll 2 based on the target current Is is given, the grinding control means 56 is operated to compare the load current supplied to the grinding wheel motor 24 and the target current Is in a step 22. If the load current Im is smaller than the target current Is, then the grinding wheel 12 is driven to cut into the roll 2 at a speed V which is expressed by:

$$V = -\left[\frac{b}{a} Is + c\right] \quad (13)$$

where a, b, c are system parameters inherent with the machine tool, in steps 23a, 24a, 25a, 26a. If the load current Im is larger than the target current Is, the grinding wheel 12 is moved away from the roll 2 at a speed V which is given by:

$$V = \frac{b}{a} Is + c \quad (14)$$

in steps 23b, 24b, 25b, 26b. When the load current Im reaches the target current Is, the command for grinding the roll 2 based on the target current is canceled in a step 27, and the grinding wheel 12 is moved only in the axial direction (Z axis) of the roll 2 in a step 28. Then, the grinding wheel 12 reaches a given position in the Z-axis direction, whereupon the movement of the grinding wheel 12 along the Z axis is finished in a step 29. The roll 2 is thus ground to the predetermined depth of cut by the grinding wheel 12.

Grinding modes according to the illustrated embodiment based on the aforesaid various functions combined together will be described below. The grinding modes include, for example, a traverse grinding mode for grinding a roll while effecting adaptive control by correcting wear on the grinding wheel and also correcting elastic deformation of the roll, a traverse grinding mode in which an intermediate cutting speed is specified, and a traverse grinding mode in which cutting into the roll at its opposite ends is specified. Particular command codes (particular commands) are determined for these three traverse grinding modes. Based on various parameters given together with a selected one of the particular commands, commands for performing the various grinding functions described above are enabled to effect the corresponding traverse grinding mode.

Figure 14:
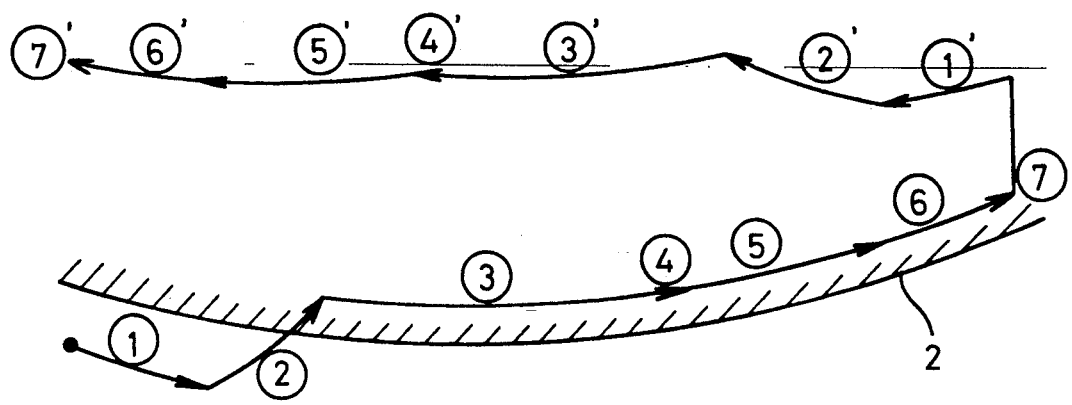
FIGS. 14 through 16 are fragmentary views showing paths of a grinding wheel according to the grinding control method of the present invention.

FIG. 14 illustrates the path of movement of the grinding wheel 12 in the traverse grinding mode in which adaptive control is employed. I this traverse grinding mode, a code representing a particular command corresponding to the mode is given, and so are parameters indicating a target current Is to be supplied to the grinding wheel motor 24, grinding end points P1 through P3 (see FIG. 6), the number N of traversing movements, a tarry time t in which the grinding wheel dwells at an end of the roll 2, and the speed F at which the grinding wheel 12 is fed. In response to the particular command code, the wear correcting function and the elastic deformation correcting function are enabled to grind the roll in the same manner as if command codes for the individual correcting functions were designated.

As shown in FIG. 14, the grinding wheel 12 grinds the roll 2 while moving in the axial direction of the roll 2. In a zone (1), the grinding wheel 12 moves along a shape defined by initial setting of the roll 2. In a zone (2), while moving in the axial direction (Z axis) of the roll 2, the grinding wheel 12 cuts into the roll 2 in the radial direction (X axis) of the roll 2 until the load current Im supplied to the grinding wheel motor 24 reaches the target current Is. Then, in a zone (3), the grinding wheel 12 grinds the roll 2 by traversing in the axial direction while effecting the wear correction and the elastic deformation correction. In a zone (4), the wear correcting coefficient q is varied on the basis of the time interval in which the wear correction has been made so far and the difference between the target current Is and the load current Im supplied to the grinding wheel motor 24, in order to accommodate the amount of wear of the grinding wheel 12 which varies with time in the grinding process. In a zone (5), using the varied wear correcting coefficient q, the grinding wheel 12 is moved to a traverse end point while effecting the wear correction and the elastic deformation correction in the same manner as in the zone (3). In a zone (6), the grinding wheel 12 moves along the roll shape defined by initial setting. The grinding wheel 12 then dwells for a designated tarry time t in a zone (7). Thereafter, as indicated by zones (1)' through (6)' and (7)'. the movements in the zones (1) through (6) and (7) are repeated by the number N of traversing movements for thereby carrying out traverse grinding.

Figure 15:
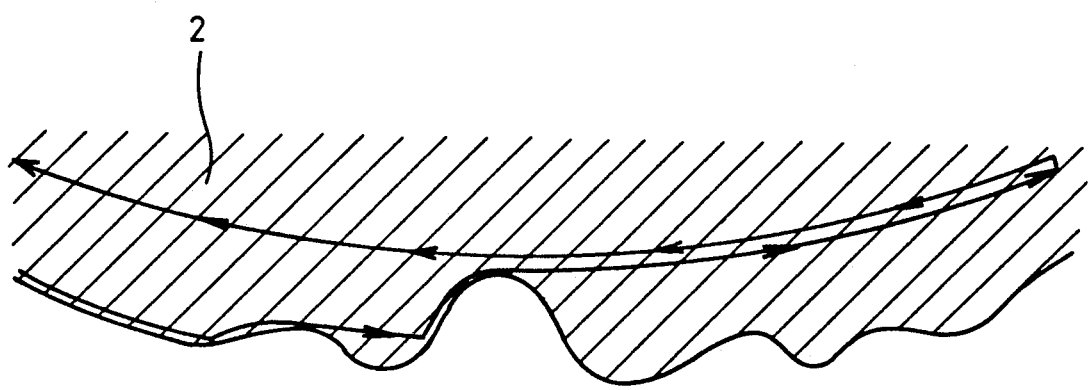

FIG. 15 shows the path of movement of the grinding wheel 12 in a traverse grinding mode in which an intermediate cutting speed is designated. In this traverse grinding mode, too, there are given a code indicative of the corresponding particular command, and parameters representing a target current Is, starting points P1 through P3, the number N of traversing movements, a tarry time t, a feed speed F, and an intermediate cutting speed V. In this traverse grinding mode, the grinding wheel 12 cuts into the roll 2 at the designated grinding speed V in the radial direction (X axis) until the target current Is is reached, before a traverse end point is reached. The grinding wheel 12 follows the path indicated by the arrows in FIG. 15. The grinding roll 12 is shaped into a roll by being ground along a defined shape down to a most worn region thereof prior to the grinding process. In the traverse grinding mode, only the function of grinding the roll 2 based on the preset current is performed whereas the adaptive control functions such as for wear correction and elastic deformation correction are not performed.

Figure 16:
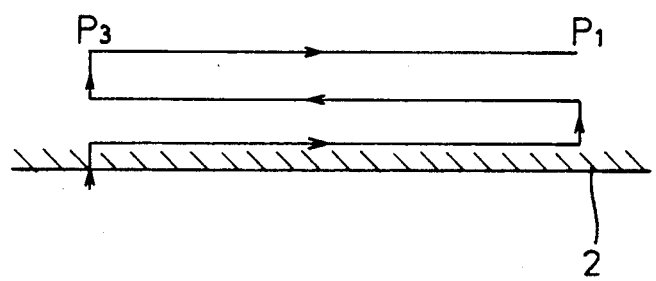

FIG. 16 illustrates the path of movement of the grinding wheel 12 in a traverse grinding mode in which the grinding roll 12 cuts into the roll 2 at its opposite ends. In this traverse grinding mode, there are given a code indicating the corresponding particular command, and parameters indicative of starting points P1 through P3, the number N of traversing movements, a tarry time t, a feed speed F, an amount of elastic deformation E at end points, and a cutting speed V at end points. In this traverse grinding mode, as indicated by the arrows in FIG. 16, the grinding wheel 12 starts traversing in opposite directions from present positions, and cuts into the roll 2 at its opposite ends by the designated number N of traversing movements at the cutting speed V with the amount of elastic deformation E. When the present position of the grinding wheel 12 is at P1 or P3, the designation of a traverse finishing point may be dispensed with. In this traverse grinding mode, grinding control based on the load current supplied to the grinding wheel motor 24 is not performed.

With the present invention, as described above, based on the fact that the drive current supplied to the grinding wheel motor and the depth of cut by the grinding wheel are in certain relationship, the drive current is detected by the detector, and the depth of cut made in the roll or workpiece by the grinding wheel is controlled so that the drive current reaches a preset current. The workpiece is ground to a desired shape by repeatedly reversing the movement of the grinding wheel in the axial direction of the workpiece. Therefore, it is not necessary to measure the worn condition of the workpiece to be trued and to program numerical control data for truing the workpiece. The workpiece can thus be ground highly efficiently. By simply setting a depth of cut by the grinding wheel as a drive current to be supplied to the grinding wheel motor, setting a starting point, and giving a truing command, the region of the workpiece which is less worn can automatically be ground to the desired depth of cut. Accordingly, the process of the present invention is more efficient than the process for uniformly grinding the workpiece.

Moreover, when the drive current meets a predetermined comparative condition, control is transferred from the present machining program to a next machining program, so that how the grinding wheel contacts the workpiece can easily and accurately be detected without measuring the shape of the workpiece or preparing a machining program. Therefore, the direction in which the grinding wheel moves with respect to the workpiece can automatically be reversed for more efficient grinding operation.

The present invention is also based on the fact that the load current supplied to the motor for rotating the grinding wheel is in certain relationship to the net depth of cut by the grinding wheel and the amount of wear on the grinding wheel. More specifically, the drive current supplied to the grinding wheel motor is detected, and the corrective amount of movement of the grinding wheel, corresponding to the amount of wear thereof, in the radial direction of the workpiece is calculated from the drive current. The calculated amount is added to the target amount of movement thereby to compensate for a reduction in the amount of grinding which is caused by the wear on the grinding wheel. Therefore, the reduction in the amount of grinding (depth of cut) which is caused by the wear on the grinding wheel in the grinding process can automatically and easily be compensated for. It is therefore possible to grind the workpiece highly accuracy without requiring complex procedures such as predicting the amount of wear on the grinding wheel and preparing numerical control data in view of a reduction in the depth of cut due to such amount of wear. Furthermore, measurement of roll dimensions, confirmation of dimensional accuracy, and repeated grinding operation are minimized in a finishing process, and hence the efficiency of the entire process is increased.

According to the present invention, furthermore, the difference between the drive current supplied to the grinding wheel motor and the target current is determined in each time interval at which the depth of cut is corrected based on the wear on the grinding wheel, for successively correcting the wear correcting coefficient, and the amount of movement of the grinding wheel is corrected based on the corrected wear correcting coefficient. The depth of cut is thus made accurate by automatically correcting successively the wear correcting coefficient dependent on the amount of wear on the grinding wheel which varies with time in the grinding process.

The present invention is also based on the fact that the load current supplied to the motor for rotating the grinding wheel is in certain relationship to the net depth of cut by the grinding wheel and the amount of elastic deformation of the grinding wheel. More specifically, the drive current supplied to the grinding wheel motor is detected, and the corrective amount of movement of the grinding wheel, corresponding to the amount of elastic deformation thereof, in the radial direction of the workpiece is calculated from the drive current. The calculated amount is added to the target amount of movement thereby to compensate for a reduction in the amount of grinding which is caused by the elastic deformation of the grinding wheel in the grinding process. Therefore, the reduction in the amount of grinding (depth of cut) which is caused by the elastic deformation of the grinding wheel in the grinding process can automatically and easily be compensated for. It is therefore possible to grind the workpiece highly accuracy without requiring complex procedures such as predicting the amount of elastic deformation of the grinding wheel and preparing numerical control data in view of a reduction in the depth of cut due to such amount of wear.

Furthermore, the grinding wheel is moved in the axial and radial directions of the workpiece based on a particular command by which a plurality of operation commands can selectively be designated by parameters, for grinding the workpiece to a desired shape under commands which are enabled by the particular command. When the workpiece is ground, one or more commands out of individual grinding functions are automatically enabled to effect the grinding process. Therefore, it is not necessary to prepare complex programs for respective workpieces, and necessary parameters can be set without operator's intervention, with the result that the efficiency of the grinding process is increased.

Moreover, simply by selecting a roll shape to be obtained and setting parameters corresponding to the selected roll shape, point group data constituting numerical control data can automatically be calculated according to a predetermined formula, and the roll can be ground to the desired roll shape according to the calculated point group data. Consequently, the grinding process can be effected highly efficiently without requiring complicated procedures such as of selecting a cam dependent on a roll shape and a roll length and programming point group data for each roll. Rolls having various curved surfaces can be ground with utmost ease by employing the numerically controlled machine tool of the present invention.

Although a certain preferred embodiment has been shown and described, it should be understood that many changes and modifications may be made therein without departing from the scope of the appended claims.

What is claimed is:

1. A numerically controlled machine tool for grinding a workpiece into a desired shape by rotating the workpiece about its own axis at a prescribed speed, and moving a grinding tool in radial and axial directions of the workpiece, said machine tool comprising:
    first drive means for moving the grinding tool in the radial direction of the workpiece;
    second drive means for moving the grinding tool in the axial direction of the workpiece;
    input means for inputting roll shape data, wherein said roll shape data includes (i) a roll number for identifying said roll shape data; (ii) a roll shape composed of a plurality of parameter curves; and (iii) parameters for said curves;
    point group data calculating means for calculating point group data for said curves according to prescribed formulas;
    memory means for storing said roll shape data for a plurality of desired shapes and their corresponding point group data;
    control means, responsive to a selection of a desired shape for controlling the operation of said first and second drive means in accordance with said point group data of said selected desire shape to grind the workpiece to the desired shape.

2. A machine tool according to claim 1 wherein the machine tool is a rotatable grinding wheel.

3. A machine tool according to claim 1 wherein said point group data calculating means and said control means includes a processor.

4. A machine tool according to claim 1 wherein said plurality of respectively defined curves includes a sine shape, a right hand taper shape, a left hand taper shape, an arc shape and a combination of said sine, taper and arc shapes.

5. A machine tool according to claim 1 wherein said tool parameters include L (length of cambering), D (depth of cambering) and RL (roll length).

6. A machine tool according to claim 5 wherein said point group data calculating means includes means for calculating a depth (X) in the radial direction of a cut to a roll, the depth (X) is defined as:

$$X = \frac{D/2}{1 - \cos\theta} [\cos(((2Z - L)/L)\theta) - \cos\theta], \text{ where}$$

Z indicates the axial position of the roll, and $\phi$ is a parameter determined by a curvature of a particular curve.

7. A method of controlling the grinding operation of a numerically controlled machine tool for grinding a workpiece into a roll shape by rotating the workpiece about its own axis at a prescribed speed, and moving a grinding tool in radial and axial directions of the workpiece, said method comprising the steps of:
    selecting a workpiece;
    selecting a desired roll shape representing the shape to which the workpiece is to be ground, said roll shape being composed of a plurality of parameter curves;
    selecting parameters for said selected roll shape curves;

inputting and storing in a memory data representing said selected workpiece, and associated said roll shape and said parameters;

calculating point group data for grinding said workpiece according to said curves;

storing said point group data in said memory at a storage area corresponding to said selected workpiece; and reading said point group data out of said memory and controlling the grinding tool based on said point group data to grind the workpiece to said selected roll shape.

8. A machine tool according to claim 7 wherein the machine tool is a rotatable grinding wheel.

9. A machine tool according to claim 7 wherein the plurality of respectively defined curves includes a sine shape, a right hand taper shape, a left hand taper shape, an arc shape and a combination of the sine, taper and arc shapes.

10. A machine tool according to claim 7 wherein the roll parameters include L (length of cambering), D (depth of cambering) and RL (roll length).

11. A machine tool according to claim 10 wherein said step of calculating point group data includes a step of calculating a depth (X) in the radial direction of a cut to a roll, the depth (X) is defined as:

$$X = \frac{D/2}{1 - \cos\theta} [\cos(((2Z - L)/L)\theta) - \cos\theta], \text{ where}$$

Z indicates the axial position of the roll, and $\phi$ is a parameter determined by a curvature of a particular curve.

* * * * *